United States Patent [19]

Fray et al.

[11] Patent Number: 4,645,650

[45] Date of Patent: Feb. 24, 1987

[54] OBTAINING AQUEOUS SOLUTION FROM INSOLUBLE METAL OXIDE

[75] Inventors: Derek J. Fray, Trumpington, England; Herbert A. Hancock, Dartmouth, Canada

[73] Assignee: National Research Development Corporation, London, United Kingdom

[21] Appl. No.: 751,859

[22] Filed: Jul. 5, 1985

[30] Foreign Application Priority Data

Jul. 12, 1984 [GB] United Kingdom ............... 8417811

[51] Int. Cl.$^4$ ............................................ C01G 45/00
[52] U.S. Cl. ............................. 423/49; 423/DIG. 4; 423/544; 423/605; 75/2; 75/101 R; 75/121; 75/114; 75/115
[58] Field of Search ............... 423/DIG. 4, 592, 605, 423/544, 599, 49, 50, 51, 52; 75/2, 101 R, 121, 114, 115

[56] References Cited

PUBLICATIONS

Agarwal, J. C. et al, "Processing of Ocean Nodules: A Technical and Economic Review, J. of Mines, vol. 28, No. 4, Apr., 1976.

*Primary Examiner*—John Doll
*Assistant Examiner*—Robert L. Stoll
*Attorney, Agent, or Firm*—Murray and Whisenhunt

[57] ABSTRACT

This method of obtaining an aqueous solution of metal values from an insoluble metal oxide is possible where the metal has a lower oxidation number in the solution than in the insoluble oxide, for example manganese (+2 and +4 respectively).

The oxide, such as $MnO_2$, is treated with hot mineral acid such as HCl in the presence of coal. After some hours, the liquid comes to contain most of the manganese as dissolved Mn(II) ion.

19 Claims, No Drawings

OBTAINING AQUEOUS SOLUTION FROM INSOLUBLE METAL OXIDE

This invention relates to a method of obtaining an aqueous solution of metal values from an insoluble metal oxide. This may find use in purifying the metal.

In the invention, the oxidation number of the metal in the insoluble oxide is higher than in the solution. The invention will be described as it applies to manganese, whose insoluble oxide is $MnO_2$ and whose soluble metal values are $Mn(II)$.

Manganese often occurs naturally in the tetravalent form, for example as the mineral pyrolusite ($MnO_2$) or in nodules, on the floor of the Atlantic and Pacific Oceans. These nodules contain a high percentage of manganese as $MnO_2$ but are notable for their content of more valuable non-ferrous metals such as copper, nickel and cobalt.

Although high-grade ore deposits supply the bulk of the manganese for metallurgical purposes, some manganese is extracted in non-elemental form from naturally occurring deposits in order to produce a high purity reactive oxide product, or to up-grade low-grade deposits.

Most of the existing processes for purifying manganese are hydrometallurgical. In order for manganese to go into aqueous solution it must be in the divalent state. Therefore, all of the tetravalent manganese compounds such as $MnO_2$ must be reduced to the divalent state before the manganese can be extracted hydrometallurgically. At present, this is usually done by a costly pyrometallurgical process which involves the use, at 700° to 800° C., of reducing agents such as coal, carbon, natural gas and hydrogen. The reduced ore is then carefully cooled to prevent re-oxidation and leached with various acid or alkaline solutions.

Alternative processes have been proposed to reduce tetravalent manganese to the soluble form by an aqueous reduction using for example sulphur dioxide and ferrous sulphate, but these processes have not been developed on a commerical scale; sulphur dioxide gives rise to awkward byproducts such as sulphuric acid and thionate (which is a waste of the reducing power of sulphur dioxide), and ferrous sulphate contributes large quantities of iron to the resultant solution. Ammoniated ammonium chloride solution containing glucose has been proposed for reducing manganese dioxide, and has the advantage that iron is not dissolved, but the use of sugar and of alkaline solutions is costly. Additionally, $MnO_2$ may be dissolved in hydrochloric acid, but a large proportion of the acid is consumed in producing a chlorine byproduct.

According to the present invention, a method of obtaining an aqueous solution of metal values from an insoluble metal oxide, the metal having a lower oxidation number in the solution than in the insoluble oxide, comprises treating the insoluble metal oxide with a negligibly oxidising acid, preferably humic acid or a mineral acid such as sulphuric or (preferably) hydrochloric acid, preferably of concentration at least 1N (preferably especially in the case of sulphuric acid, up to 5N), at a temperature of at least 80° C. (preferably at least 90° C., more preferably at least 95° C.), in the presence of at least ½ part by mass (preferably at least 1 part, more preferably at least 2 parts) of a carbonaceous material (such as a naturally occurring hydrocarbon or oil or a solid organic mineral such as coal or extracts from any of these) per part of the metal oxide, the carbonaceous material preferably being of a particle size smaller than 500 microns, more preferably smaller than 100 microns.

The carbonaceous material is preferably a solid organic mineral rich in carbon such as peat, lignite, brown coal, sub-bituminous coal and bituminous coal, and may permissibly contain iron impurities such as pyrites. While various coals may be used, lignite is preferred, as it appears to encourage a faster reaction.

In the method, the solids (the metal oxide plus the carbonaceous material) preferably do not exceed 300 g (more preferably do not exceed 100 g) per liter of the acid.

This method is suitable for handling wet feedstock and, in addition, where hydrochloric acid is used, the method may be able to tolerate seawater which may accompany freshly won ocean-floor nodules.

The invention will now be described by way of example.

To eliminate spurious effects, the method was performed on chemical-grade manganese dioxide $MnO_2$. In other trials, the method was however shown to work on manganese nodues, natural pyrolusite and Amarpa Fires ore. In the nodules trials, the dissolution of the $MnO_2$ was accompanied by dissolution of other non-ferrous metals such as nickel and copper.

The reducing agent was coal, in particular bituminous coal from the Silkstone seam of Cortonwood Mine (Great Britain). This coal is very low in ash (2.2%) and contains almost no sulphide. Its full analysis is:

| PROXIMATE ANALYSIS | % | ULTIMATE ANALYSIS | % |
| --- | --- | --- | --- |
| Moisture (AD) | 1.0 | Carbon (DM) | 87.20 |
| Ash (AD) | 2.2 | Hydrogen (DM) | 5.60 |
| Volatile Matter (AD) | 34.7 | Oxygen (DM) | 3.90 |
| Fixed Carbon (AD) | 62.1 | Nitrogen (DM) | 1.70 |
| Volatile Matter (DAF) | 35.8 | Sulphur (organic) (DM) | 0.70 |
| | | Sulphur (total) (DB) | 0.70 |
| | | Chlorine (DB) | 0.09 |
| | | Carbon Dioxide (DB) | 0.35 |
| | | Mineral Matter (DB) | 2.73 |

AD = as determined basis
DAF = dry ash free basis
DM = dry mineral matter free basis
DB = dry basis In the method, this coal was ground and wet-screened to smaller than 75 microns. Experiments performed on size fractions 75–150 microns and 150–250 microns showed a diminishing reaction rate, not unexpectedly.

In one trial, the coal was given a preliminary acid-wash which was found to be actually slightly deleterious, and is therefore not necessary in the method. Dissolved iron is not required for this invention and in low concentration (2 to 8 g/l) may be slightly deleterious to the rate. Larger quantities (over 10 g/l) are not harmful and may even be beneficial.

The acid was sulphuric or hydrochloric. The rate of reaction was dependent on acid concentration, markedly so in the case of sulphuric acid, where quarter-normal was impracticably slow, 1N adequate, 2N good and 4N although faster to start, not better in the long run. With hydrochloric acid, ½N was rather slow, 1N adequate and 2N excellent.

Mass ratios coal:$MnO_2$ were tried of 0.1:1, 0.2:1, 0.4:1, 2:1 and 5:1. The reduction rate steadily improved in that order, the first three (not according to the invention) being too slow.

Concentrations of solids in the liquids, that is ($MnO_2$+coal) in the acid, were experimentally varied from 300 g/l down to 50 g/l and the reduction rate to substantial completion was found to be fastest at the lowest concentrations. However, a lower reduction rate may be acceptable to minimise reaction vessel size and acid inventory.

The higher the temperature of the acid, the faster the reaction. 73° C. is too slow, 80° C. is borderline, 86° C. adequate, 93° C. good and 97° C. very good. At atmospheric pressure, 2N sulphuric acid boils at 102° C. and, while pressure vessels could be used to attain higher temperatures and faster rates, their expense is unlikely to be worthwhile.

Following these trials, suitable methods according to the invention are as follows:

EXAMPLE 1

A 2N aqueous solution of sulphuric acid $H_2SO_4$ (that is, 100 g/l) was heated to 97° C. and stirred throughout. To it were added 10 g/ of manganese dioxide $MnO_2$ and 50 g/l of the coal described above. The solution contained 2.85 g/l iron as dissolved salts. The concentration of divalent manganese Mn(II) ion in the solution rose steadily, until, after 4 hours, the concentration was equivalent to 100% extraction of the initial manganese dioxide.

EXAMPLE 2

A 2N aqueous solution of hydrochloric acid HCl (that is, 73 g/l) was heated to 98° C. and stirred throughout. To it were added 10 g/l of manganese dioxide and 50 g/l of the coal described above. The concentration of divalent manganese Mn(II) ion in the solution rose sharply; in the first six minutes, over 90% of the manganese had been extracted. This continues to rise but much more slowly; thus, after 2 hours, over 95% had been extracted.

Analysis of the reagents for chloride ion shows a greater concentration of chloride ion than would be expected from this reaction:

$$MnO_2 + 4HCl \rightarrow MnCl_2 + Cl_2 + 2H_2O.$$

Thus the coal has encouraged dissolution of $MnO_2$ and discouraged wasteful production of elemental chlorine.

We claim:

1. A method of obtaining an aqueous solution of a maganese compound from an insoluble maganese metal oxide, the manganese having a lower oxidation number in the solution than in the insoluble oxide, comprising treating the insoluble manganese oxide at about atmospheric pressure with a acid at a temperature of at least 80° C. in the presence of at least ½ part by mass of a carbonaceous material per part of the metal oxide.

2. A method according to claim 1, wherein the acid is a mineral acid.

3. A method according to claim 2, wherein the acid is sulphuric acid.

4. A method according to claim 3, wherein the concentration of the sulphuric acid is up to 5N.

5. A method according to claim 2, wherein the acid is hydrochloric acid.

6. A method according to claim 1, wherein the concentration of the acid is at least 1N.

7. A method according to claim 1, wherein the acid is derived from humus.

8. A method according to claim 1, wherein the temperature is at least 90° C.

9. A method according to claim 8, wherein the temperature is at least 95° C.

10. A method according to claim 1, wherein the carbonaceous material is present in at least 1 part by mass per part of the metal oxide.

11. A method according to claim 10, wherein the carbonaceous material is present in at least 2 parts by mass per part of the metal oxide.

12. A method according to claim 1, wherein the carbonaceous material is selected from the group consisting of a naturally occurring hydrocarbon, oil, a solid organic mineral and an extract from any of these.

13. A method according to claim 12, wherein the carbonaceous material is one of coal and a coal extract.

14. A method according to claim 12, wherein the carbonaceous material is peat, lignite, brown coal, subbituminous coal or bituminous coal.

15. A method according to claim 14, wherein the carbonaecous material is lignite.

16. A method according to claim 1, wherein the carbonaceous material is of a particle size smaller than 500 microns.

17. A method according to claim 16, wherein the carbonaceous material is of a particle size smaller than 100 microns.

18. A method according to claim 1, wherein the manganese oxide plus the carbonaceous material are up to 300 g per liter of the acid.

19. A method according to claim 18, wherein the manganese oxide plus the carbonaceous material are up to 100 g per liter of the acid.

* * * * *